United States Patent [19]

Barth

[11] 4,192,621
[45] Mar. 11, 1980

[54] METHOD FOR INTERCONNECTING TWO SHAFT-ENDS AND A SHAFT COUPLING MADE IN ACCORDANCE WITH SAID METHOD

[75] Inventor: Aksel Barth, Hisings Backa, Sweden

[73] Assignee: Ab Göthenburg Motor, Gothenburg, Sweden

[21] Appl. No.: 945,912

[22] Filed: Sep. 26, 1978

[51] Int. Cl.² ............................................. F16D 1/02
[52] U.S. Cl. ..................................... 403/15; 403/337; 85/1 T; 29/523
[58] Field of Search .......................... 403/337, 15, 374; 85/1 T; 29/523, 526, 252

[56] References Cited

U.S. PATENT DOCUMENTS 3,173,522  3/1965  Zimmer et al. ...................... 403/337

FOREIGN PATENT DOCUMENTS 2049580  9/1971  Fed. Rep. of Germany ............. 403/15
434200  11/1974  U.S.S.R. .................................. 403/374
446683  12/1974  U.S.S.R. .................................. 404/337

Primary Examiner—Andrew V. Kundrat
Attorney, Agent, or Firm—Holman & Stern

[57] ABSTRACT

The invention refers to a method for interconnecting two flange-provided shaft ends by means of taper pin bolts and expander sleeves co-operating therewith as well as a shaft coupling assembled accordingly. The shaft coupling is intended to transfer very large torques and great bending stresses, e.g. in steam and nuclear power plants. The new shaft coupling and the mounting method enable the use of the same bolt as an expansion-shell bolt, for achieving the desired press fit, and as a set bolt, which can be pre-loaded to function like a hard-tightened fitting bolt. This has been achieved on one hand by preventing the expander sleeve from moving axially, when the bolt is tightened, and on the other hand by abolishing the friction between the sleeve and the bolt after achieving the desired press fit, whereupon the bolt is further tightened up close to the yield point of the bolt. In this position the bolt is fixed by means of the nut so that the bolt preserves the desired press fit as well as the pre-load.

2 Claims, 6 Drawing Figures

METHOD FOR INTERCONNECTING TWO SHAFT-ENDS AND A SHAFT COUPLING MADE IN ACCORDANCE WITH SAID METHOD

BACKGROUND OF THE INVENTION

The present invention relates to a method for interconnecting two flanged shaft ends by means of taper pin bolts and expander sleeves co-operating therewith and made with the same inner taper, said sleeves extending through bores in the flanges, and a shaft coupling made in accordance with said method.

For transfer of large torques and also bending moments it is known to use shaft couplings where the torsional moment is transferred via expansion-shell bolts and the bending moment via set bolts, which are preferably pre-loaded to a certain extent. The expansion-shell bolt can only take up comparatively small bending moments. On the contrary the set bolt is not adapted to take up torsional moments if it has not been fitted very accurately into the flange bores. This fitting is associated with very big difficulties and costs as far as the set bolt is concerned and this possibility can therefore be used only in exceptional cases. When transferring large torsional moments at very high speeds the space available is not enough for expansion-shell bolts and as a natural consequence of this the attention has been drawn to the set bolts, which—if they can be designed to transfer torsional moments as well—make possible the transfer of considerably greater effects.

SUMMARY OF THE INVENTION

The purpose of the present invention is thus to provide a shaft coupling and a method for interconnecting two shaft ends to enable each bolt to transfer torsional moments as well as bending moments without having to increase the diameter of the flanges of the shaft ends and without the necessity of using complicated and expensive manufacturing methods. This task has been solved by the following lines of action: The bolt and the expander sleeve are loosely inserted into their bores until the expander sleeve bears against a stop in the bore; the smaller end of the conical bolt is subjected to tightening, whereby the sleeve will expand and a press fit is achieved; a nut arranged on the larger end of the bolt is tightened against the flange and a friction-decreasing medium is pressed in between the sleeve and the bolt so that the friction is essentially eliminated; the bolt is subjected to further tightening close to the yield point of the bolt material; a nut arranged on the smaller end of the bolt is tightened against the other flange; whereupon the pressure of the friction-decreasing medium and the tractive force acting on the bolt are abolished.

BRIEF DESCRIPTION OF THE DRAWINGS

The invention will herebelow be further described with reference to the drawings wherein.

DESCRIPTION OF THE PREFERRED EMBODIMENTS

Figure 1:
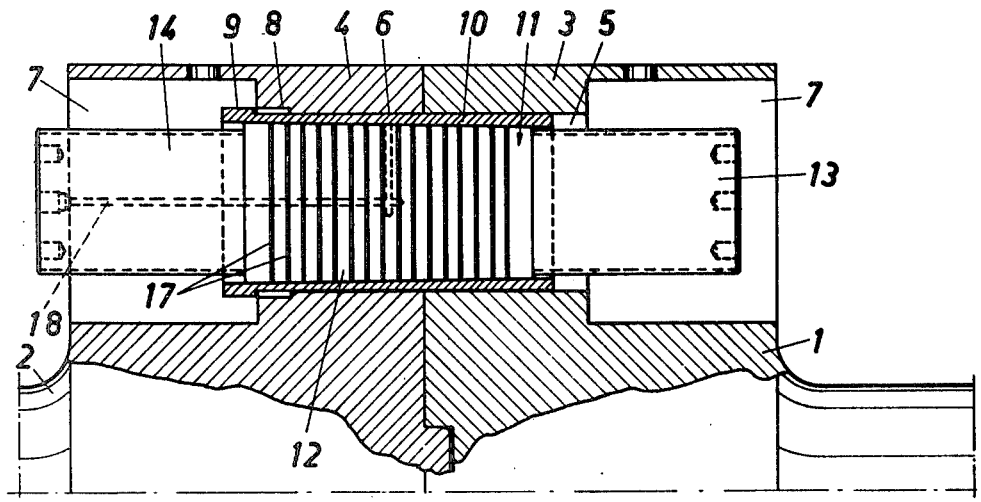
FIGS. 1–4 show sections through a part of a shaft coupling in different mounting positions.

The shaft coupling according to the invention consists of two shaft ends 1 and 2 provided with one flange 3 and 4 each. The flanges are provided with a number of cylindrical bores 5 and 6, located opposite each other.

In the embodiment shown the bores are provided with countersinks 7 at the flange sides turned from each other, which countersinks offer space for the nuts of the shaft coupling. One of the bores 6 has a circumferential recess 8 communicating with the countersink 7, which recess is intended to receive a corresponding flange 9 arranged at one end of a sleeve 10, which fits into the bores 5 and 6 with slight clearance. The interior of the sleeve 10 is designed with a slight conicity and the larger end of the cone is located nearest to the flange 9. A pin bolt 11, designed with a conical shank 12 with the same conicity as the sleeve, as appears from FIG. 1, can be introduced into said sleeve 10. The pin bolt 11 on either side of the shank has coaxial shaft extensions 13, 14 provided with outer threads, for nuts 15, 16. The shanks 12 of the pin bolts 11 are provided with circumferential grooves 17, which via a passage 18 communicate with the end of the shaft extension 14, i.e. at the side of the pin bolt where the conical shank is widest.

The interconnecting of the shaft coupling is done in the following way.

Phase 1—FIG. 1

The sleeve 10 is slipped onto the pin bolt 11, and is thereupon loosely inserted into the bores 5 and 6 so that the flange 9 will rest against the recess 8. The nuts 15 and 16 are thereupon attached to the shaft extensions 13 and 14 so that these will be located at some distance from the bottom of the countersinks 7.

Figure 2:
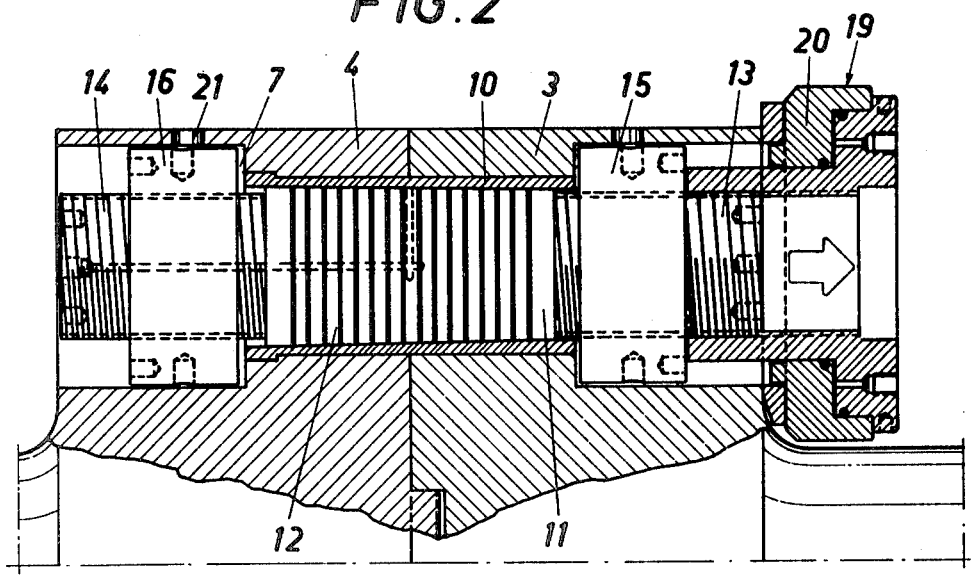

Phase 2—FIG. 2

A preferably hydraulically actuated tightening device, which by means of a piston 20, can be brought to bear against the flange 3 is screwed onto the shaft extensions 13, which extends outside the nut 15. With the aid of the tightening device the pin bolt can be subjected to a tractive force, whereby its taper shank 12 will be pushed into the sleeve which will expand to a very hard contact against the bores 5 and 6, respectively. The sleeve 10 cannot perform any axial movement due to the co-operating stop members comprising the recess 8 and the flange 9, whereby the desired press fit is achieved.

Figure 3:
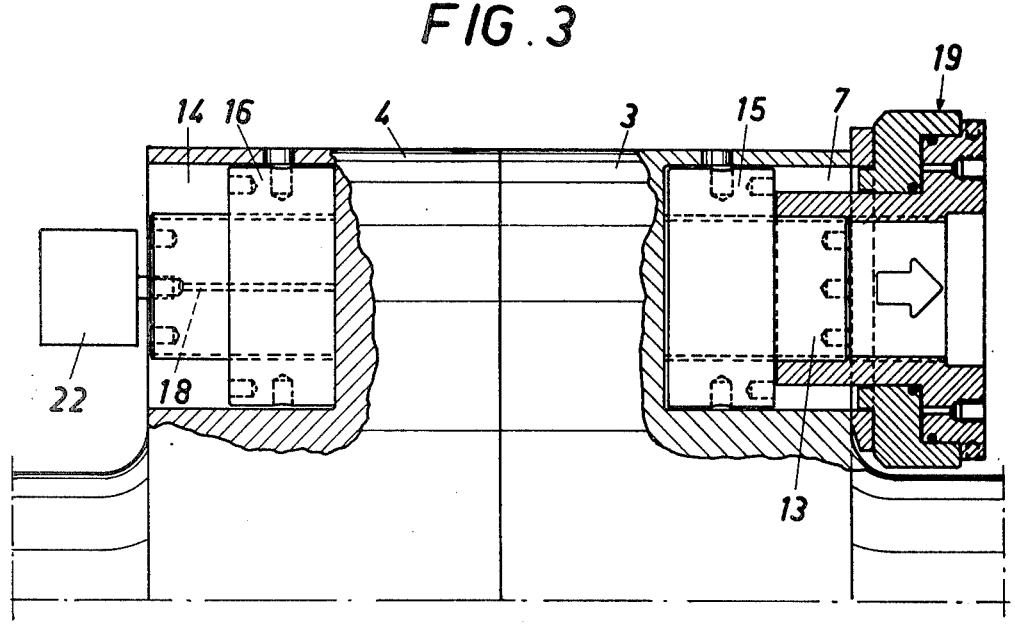

Phase 3—FIG. 3

While preserving the tractive force at one end of the pin bolt the nut 16, at the opposite end of the bolt is screwed up to bear against the bottom of the countersink 7. For ascertaining that the nut is easy to reach a slot 21 is arranged in the flange, through which slot a tool can be inserted. To the mouth of the feeding channel 18 which communicates with the grooves 17, is connected an injector 22 for a high pressure medium, e.g. oil which under pressure is pressed in between the sleeve 10 and the shank 12 of the pin bolt 11 to eliminate or considerably reduce the friction. The pin bolt is thereafter subjected to further tractive force by means of the tightening device 19 up to about 80% of the yield point of the bolt material, without any further expansion of the sleeve, as the nut 16 prevents axial displacement of the taper bolt shank 12. As the friction between the sleeve and the shank is practically zero a strong preload on the bolt is achieved, whereby this bolt apart from having a desired press fit also will act as a hard-tightened set bolt.

Figure 4:
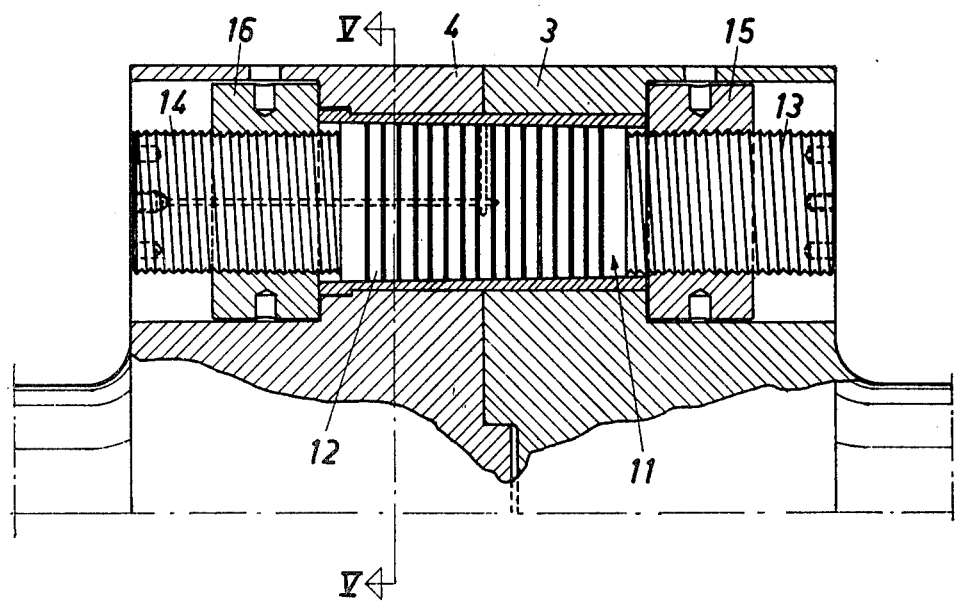
Figure 5:
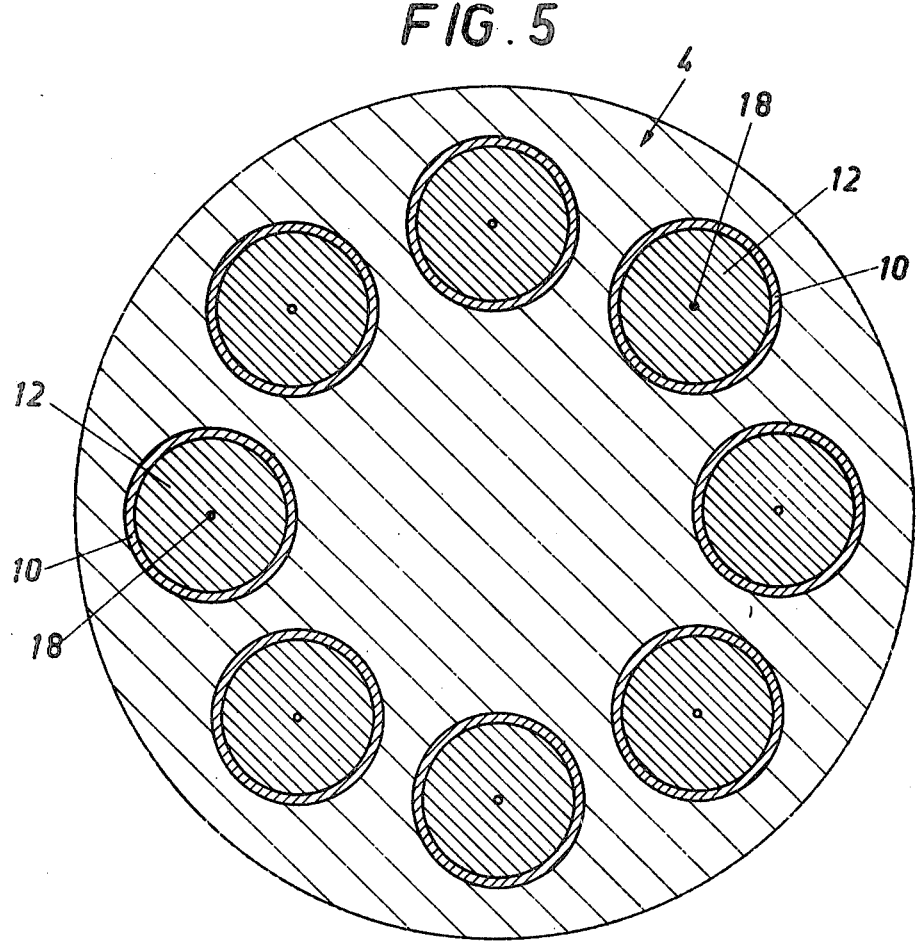
FIG. 5 shows a section through the shaft coupling along the line V—V in FIG. 4.

Phase 4—FIG. 4

When the desired pre-stress is achieved the nut 15 is tightened so it bears against the bottom of the countersink 7. The injector 22 for the high pressure medium can after that be removed and the shaft extension 13 is disengaged to allow the tightening device 19 to be unscrewed. In the same way the rest of the pin bolts can be mounted one by one or several at a time. It is of course also possible to tighten all the bolts at the same time.

Figure 6:
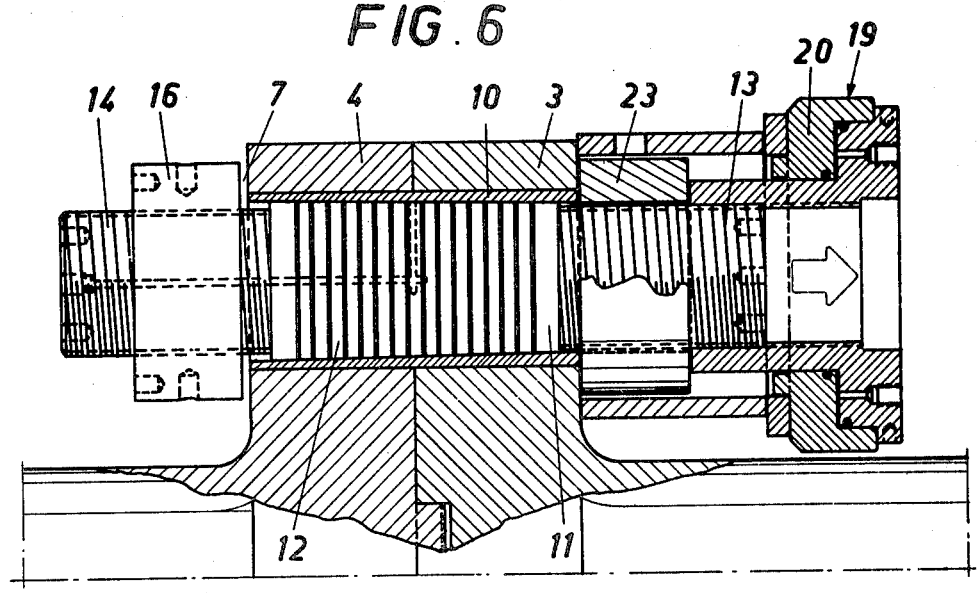
FIG. 6 shows a section analogous with FIG. 2 of a modified embodiment of a shaft coupling according to the invention.

In the modified embodiment shown in FIG. 6 the bore 6 has no circumferential recess 8 and the sleeve 10 has no corresponding flange 9. The axial positioning of the sleeve is in this embodiment instead is obtained by a washer 23 fitted in the place of the screw 15 to engage the flange 3 and to provide a support for the tightening device 19 with its opposite side.

The washer 23 is used during phases 1 and 2 in accordance with the steps described hereinbefore i.e. for obtaining a desired press fit, and when this has been obtained and the nut 16 has been screwed to engagement against the flange 4 is it possible to remove the tightening device 19 and the washer 23 and the nut 15 can be put in place i.e. at some distance from the flange 3. When the tightening device 19 is again connected to the threaded shaft extension 13 of the bolt is it possible to bring about the preloading of the bolt and the nut 15 can be screwed into engagement with the flange 3.

What I claim is:

1. A method for interconnecting two flanged shaft ends by means of taper pin bolts and expander sleeves co-operating therewith, said bolts and said sleeves having the same inner taper, and said sleeves extending through bores in the flanges, the method comprising the steps of:
    (a) loosely inserting each bolt and expander sleeve into associated bores until the expander sleeve bears against a stop in one of the bores,
    (b) subjecting the smaller end of the taper bolt to a tightening force whereby the sleeve expands to a press fit within said bores,
    (c) providing a nut on the larger end of the bolt, tightening the nut against one of the flanges and introducing a friction-creasing medium between the sleeve and the bolt essentially to eliminate friction therebetween,
    (d) subjecting the bolt to further tightening to a state close to the yield point of the bolt material, and
    (e) providing a further nut on the smaller end of the bolt, tightening said further nut against the other flange, and releasing the pressure of the friction-decreasing medium and the tractive force acting on the bolt.

2. A shaft coupling for interconnecting two flanged shaft ends comprising taper pin bolts and expander sleeves cooperating therewith, said bolts and sleeves having the same inner taper, and extending through bores in the flanges, means for fixing the axial position of the sleeves in the respective bores, each pin bolt including a shank located inside a respective sleeve, said shank having cumferential grooves communicating with a feed passage, said passage communicating with the larger end of the taper bolt for the supply of pressure medium to said grooves, said bolt shank having a threaded shaft extension at its smaller end, a nut threaded on said extension, said extension projecting beyond said nut for the connection of a tightening device, said means for fixing the axial position of the sleeves in the bores comprising a locking washer designed to be applied to each said shank extension outside the bore.

* * * * *

UNITED STATES PATENT OFFICE
CERTIFICATE OF CORRECTION

Patent No. 4,192,621  Dated March 11, 1980

Inventor(s) ASKEL BARTH

It is certified that error appears in the above-identified patent and that said Letters Patent are hereby corrected as shown below:

[73] Assignee should read:
-- AB Götaverken Motor
Göteborg, Sweden --.

Signed and Sealed this

Fifth Day of August 1980

[SEAL]

Attest:

SIDNEY A. DIAMOND

Attesting Officer  Commissioner of Patents and Trademarks